United States Patent [19]

Okuda

[11] Patent Number: 5,361,136
[45] Date of Patent: Nov. 1, 1994

[54] APPARATUS FOR DETECTING CROSSTALK IN REPRODUCED HIGH-VISION SIGNAL

[75] Inventor: Yoshiyuki Okuda, Tokorozawa, Japan

[73] Assignee: Pioneer Electronic Corporation, Tokyo, Japan

[21] Appl. No.: 24,956

[22] Filed: Mar. 2, 1993

[30] Foreign Application Priority Data

Mar. 5, 1992 [JP] Japan .................... 4-048672

[51] Int. Cl.$^5$ .................... H04N 5/76; H04N 5/21
[52] U.S. Cl. .................... 358/340; 358/328; 358/337
[58] Field of Search ............ 358/335, 310, 320, 328, 358/337, 340, 322, 36, 167; 360/36.1, 36.2; 369/43, 47

[56] References Cited

U.S. PATENT DOCUMENTS 4,313,129  1/1982  Fukui .................... 358/322
4,884,129 11/1989  Ozawa et al. ............ 358/44

FOREIGN PATENT DOCUMENTS 59-168835 11/1984  Japan .
437384    2/1992  Japan .

*Primary Examiner*—Tommy P. Chin
*Assistant Examiner*—Huy Nguyen
*Attorney, Agent, or Firm*—Sughrue, Mion, Zinn, Macpeak & Seas

[57] ABSTRACT

A crosstalk detecting apparatus for detecting crosstalk which may occur upon reading an FM-modulated signal recorded on a recording medium, wherein the crosstalk detecting apparatus outputs a crosstalk amount from an adjacent track based on a signal read by a pickup. On a medium with which this crosstalk detecting apparatus can detect crosstalk, an image signal and an identification signal are FM-modulated and recorded on each of three tracks adjacent to one another, and the FM-modulated identification signal is recorded on each of the three tracks such that initial phases of the FM-modulated identification signals are all made equal. Also, the crosstalk detecting apparatus includes a timing pulse generator for generating a pulse at a predetermined time within the identification signal period; a phase detecting circuit for detecting a phase difference for the case where no crosstalk appears in a signal read from a central track; and a sampling circuit for sampling the output from the phase detecting circuit with a timing pulse generated by the timing pulse generator.

2 Claims, 3 Drawing Sheets

FIG. I(A)
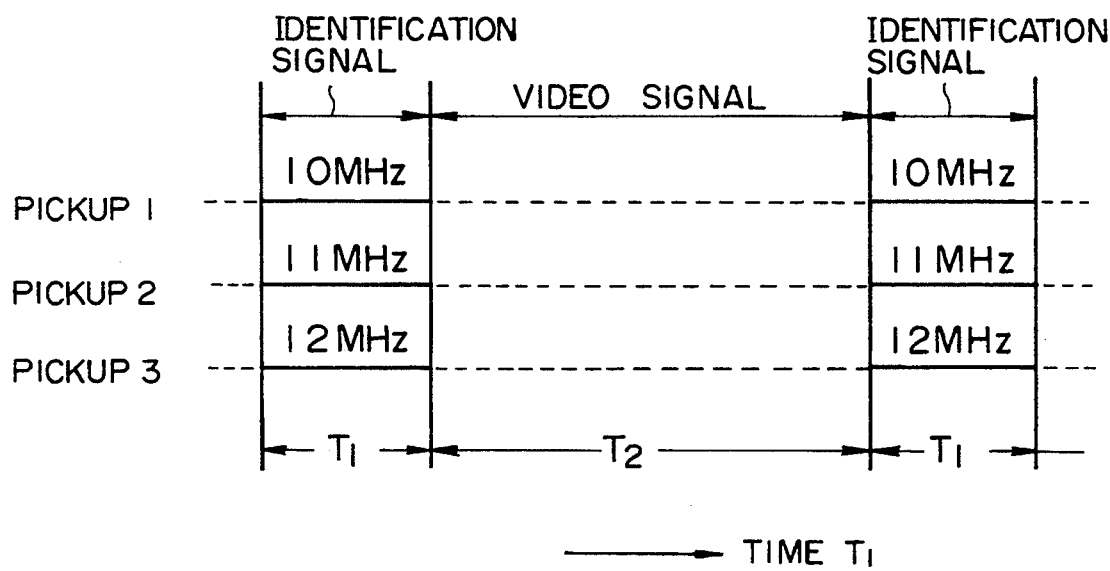
FIG. I(B)
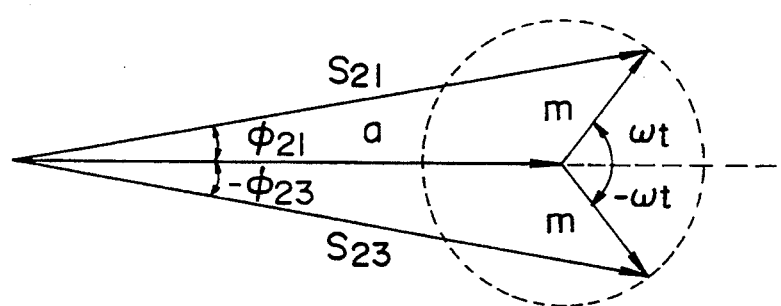

APPARATUS FOR DETECTING CROSSTALK IN REPRODUCED HIGH-VISION SIGNAL

BACKGROUND OF THE INVENTION

This invention relates to a crosstalk detecting apparatus for detecting crosstalk which may occur from an adjacent track when an image signal FM-modulated and recorded on a recording medium is read out.

A high-vision signal having 1,125 horizontal scanning lines per frame requires a much wider frequency band in comparison with an NTSC signal having 525 horizontal scanning lines, and specifically, a frequency band of approximately 30 MHz is necessary.

A method of recording such a wide band high-vision signal on an optical disk or the like is disclosed in Japanese Patent Application No. 2-143589, entitled "Apparatus and Recording Medium for High-Vision Signal Recording".

According to this prior art, three tracks on a recording medium are simultaneously used to accumulatively process a supplied high-vision signal which is then divided for every three consecutive scanning lines, and signals corresponding to the divided three scanning lines are recorded on the three tracks in a corresponding relationship. In other words, the simultaneous use of the three tracks causes a sweeping time to be multiplied by a factor of three, thereby recording a signal with the frequency band thereof being reduced to ⅓.

When a signal is recorded on a recording medium, a signal having a different level for each of three tracks (this signal hereinafter designates identification signal) is added to the image signal in order to identify the three different tracks upon reproducing the signal on the recording medium. Thus, during a period in which the identification signal is added, a reproduced output contains an FM wave which was generated when the identification signal was FM-modulated, and the FM wave at a different frequency is reproduced for each of the three tracks.

For thus using three tracks and reading out signals from a recording medium on which FM-modulated signals have been recorded, pickups for reading out the signals are required to perpendicularly face the tracks. Generally, for placing a pickup perpendicularly to a track, a servo system is employed which detects a displacement of the pickup from its normal perpendicularly facing position to the track and moves the pickup so as to make the displacement 0.

The present invention provides an apparatus for detecting a signal corresponding to the above-mentioned signal indicative of a displacement. In general, as described in Japanese Laid-open Utility Model Application No. 59-168835, entitled "Apparatus for Optically Reading Information," light emitted from a light emitting element and reflected by the disk surface is received by a pair of light receiving elements associated with the light emitting element, and the difference between output signals of light receiving elements is outputted as a displacement.

As described above, the difference between output signals from two light receiving elements associated with a light emitting element has been outputted as a displacement signal. For this purpose, the light emitting element and light receiving elements are required to be placed at highly precise positions, which can only be achieved by an expert. Also, even if an outputted displacement signal indicates zero, some of the signal read by a pickup may be mixed with crosstalk from an adjacent track.

SUMMARY OF THE INVENTION

An object of the present invention is to provide a crosstalk detecting apparatus which outputs a crosstalk amount from an adjacent track based on a signal read by a pickup.

According to a first aspect of the present invention, there is provided a crosstalk detecting apparatus for detecting an amount of crosstalk which occurs when an image signal and an identification signal are read from a medium on which the image signal and the identification signal are FM-modulated and recorded on three tracks adjacent to one another, wherein the FM-modulated identification signal is recorded on each of the three tracks such that initial phases thereof on the three tracks are all made equal, comprising:

timing pulse generating means for generating a pulse at a predetermined time within the identification signal period;

phase detecting means for detecting a phase difference when no crosstalk appears in a signal read from the central track; and a sampling means for sampling the output from the phase detecting means with a timing pulse outputted from the timing pulse generating means.

In the above crosstalk detecting apparatus, the timing pulse generating means generates a pulse at a predetermined time within an identification signal period. The phase detecting means outputs a phase angle corresponding to the case where no crosstalk appears. The sampling means samples output signal from the phase detecting means with a pulse generated by the timing pulse generating means at a predetermined time, and outputs the sampled signal.

By thus recording the FM waves on a medium such that initial phases thereof on a central track and adjacent tracks are all made equal, detecting a phase difference for the case where no crosstalk appears in a signal read from the central track, and outputting the same as a crosstalk amount, the apparatus can be made simple in construction.

Also, according to a second aspect of the present invention, there is provided a crosstalk detecting apparatus for detecting an amount of crosstalk which occurs when an image signal and an identification signal are read from a medium on which the image signal and the identification signal are FM-modulated and recorded on three tracks adjacent to one another, wherein the FM-modulated identification signal is recorded on each of the three tracks such that initial phases thereof differ by $\pi/2$ between the central track and each of the tracks adjacent to the central track, the crosstalk detecting apparatus comprising:

timing pulse generating means for generating a pulse at predetermined two points of time within the identification signal period;

AM modulating means for AM-demodulating a signal read from the central track;

first sample and hold means for sampling the output of the AM demodulating means with a pulse generated at a first point of time by the timing pulse generating means;

second sample and hold means for sampling the output of the AM demodulating means with a pulse generated at a second point of time by the timing pulse generating means; and subtracting means for subtracting a value held by one of the first and second sample and hold means from a value held by the other sample and hold means.

In the second crosstalk detecting apparatus, the timing pulse generating means generates pulses respectively at two points of time within an identification signal period. The AM demodulating means outputs an AM-demodulated value of a signal reproduced from a central track. The first sample and hold means holds a value of the output from the AM demodulating means which is sampled with a pulse generated at a first point of time by the timing pulse generating means. The second sample and hold means holds a value of the output from the demodulating means which is sampled with a pulse generated at a second point of time by the timing pulse generating means. The subtracting means executes subtraction between the value held in the first sample and hold means and the value held in the second sample and hold means.

As described above, in the second crosstalk detecting apparatus, FM waves are recorded on a central track and both adjacent tracks such that initial phases of both the adjacent tracks are respectively made different by $\pi/2$ with respect to the central track, a signal read from the central track is AM-modulated, and the difference in AM-modulated output values between two points of time within an identification signal period is outputted as a crosstalk amount, so that the apparatus can be made simple in construction.

The above and other objects and advantages will become more readily apparent when reference is made to the following description taken in conjunction with the accompanying drawings.

BRIEF DESCRIPTION OF THE DRAWINGS

FIG. 1(A) is diagram showing signals read from three tracks in a reading method by which crosstalk is detected by the crosstalk detecting apparatus according to the present invention;

FIG. 1(B) is a diagram explaining the principle of detecting crosstalk in the crosstalk detecting apparatus according to the present invention;

DESCRIPTION OF THE PREFERRED EMBODIMENTS

Figure 2:
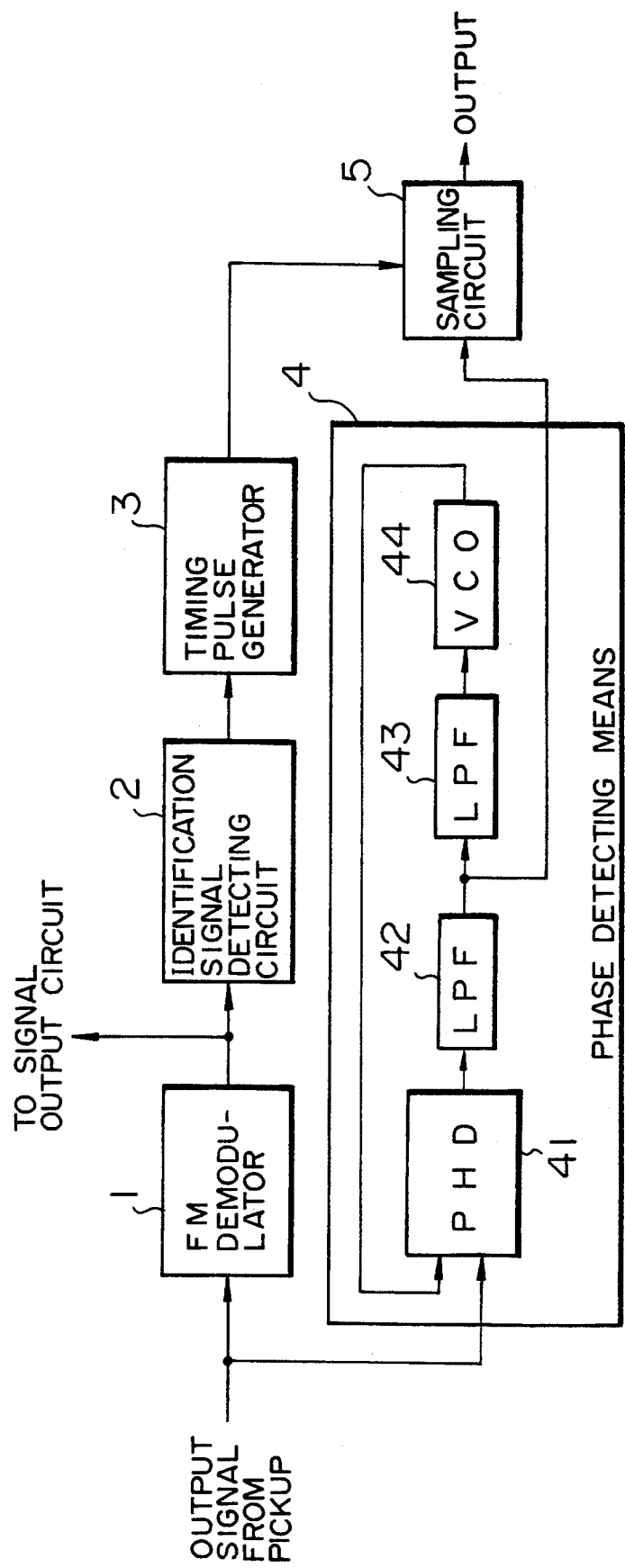
FIG. 2 is a block diagram showing the configuration of a first embodiment of a crosstalk detecting apparatus according to the present invention.

Before describing an embodiment according to the present invention, the principle of the present invention will be explained with reference to FIGS. 1(A) and 1(B).

FIG. 1(A) illustrates output signals from pickups 1-3 when signals are read from three different tracks on a recording medium.

During a period indicated by an identification signal read by each pickup, for example, an FM-wave at 10 MHz is outputted from the pickup 1 and FM-waves at 11 MHz and 12 MHz are outputted respectively from the pickup 2 and 3. During a video signal period, each of FM-modulated video signals is outputted.

When a pickup is in a normal position to a track on a recording medium, crosstalk will not occur from adjacent tracks. However, for example, if the optical axis of the pickup 2 is inclined to cause coma aberration and consequently crosstalk occurs from a track 1, an output $y_{21}$ from the pickup 2 when reading the identification signal is expressed by:

$$y_{21} = a_2\cos\omega_2 t + ka_1\cos\omega_1 t \equiv a\cos\omega_2 t + m\cos\omega_1 t \quad (1)$$

The equation (1) may be transformed in vector representation with $\cos\omega_2 t$ being defined as a reference vector:

$$y_{21} = a + m\cos(\omega_2 - \omega_1)t + jm\sin(\omega_2 - \omega_1)t \equiv \quad (2)$$

$$a + m\cos\omega t + jm\sin\omega t$$

Specifically explaining, the equation (2) represents, as shown in FIG. 1(B), that a vector having a value m anti-clockwisely rotates with respect to the reference vector designated a at an angular velocity $\omega$.

Therefore, the amplitude $S_{21}$ of a composite vector is expressed by:

$$S_{21} = \{(a + m\cos\omega t)^2 + (m\sin\omega t)^2\}^{0.5} = \quad (3)$$

$$(a^2 + 2am\cos\omega t + m^2)^{0.5}$$

The phase $\phi_{21}$ is expressed by:

$$\phi_{21} = \arctan[m\sin\omega t/(a+m\cos\omega t)] \quad (4)$$

If the pickup 2 is shifted toward a track 3, a vector m indicated in FIG. 1(B) clockwisely rotates at an angular velocity $\omega$, and the amplitude $S_{23}$ of a composite vector is expressed by:

$$S_{23} = \{a^2 + 2am\cos(-\omega t) + m^2\}^{0.5} \quad (5$$

and the phase $\phi_{23}$ is expressed by:

$$\phi_{23} = \arctan[-m\sin\omega t/(a+m\cos\omega t)] \quad (6)$$

Then, at a time $\omega t = \pi/2$, the equation (4) is given by:

$$\phi_{21} = \arctan[m/a] \quad (7)$$

while the equation (6) at that time is expressed by:

$$\phi_{23} = \arctan[-m/a] \quad (8)$$

It is therefore determined that the pickup 2 is shifted toward the track 1 if a demodulated output at the time $\omega t = \pi/2$ presents a positive value, while the pickup 2 is shifted toward the track 3 if the output presents a negative value. With respect to the time $\omega t = \pi/2$, since it is easy to record the identification signals on three tracks such that $\omega t = \pi/2$ is satisfied at a predetermined time during an identification signal period, it is also easy to carry out determination at the predetermined time.

Since the value a is constant in the equations (9) and (10), a tangent of the demodulated output $\phi$ is calculated so that a value proportional to crosstalk m is derived. When a crosstalk amount is used as a feedback signal to a tracking servo for the pickups, a tangent of the demodulated output $\phi$ does not have to be calculated, and instead $\phi$ as it is may be fed back.

It should be noted that determination made even at a time except the time $\omega t = \pi/2$ results in deriving the values expressed by the equations (4) and (6), so that these values may also be used as feedback signals for tracking servo.

Alternatively, if the identification signal is recorded on a recording medium with the phase being shifted by $\pi/2$ for each track, i.e., the phase of the track 2 is delayed by $\pi/2$ from the track 1 and advanced by $\pi/2$ from the track 3, the amplitude $S_{21}$ of the composite vector expressed by the equation (3) is transformed to:

$$S_{21} = \{a^2 + 2am \cos(\omega t + \pi/2) + m^2\}^{0.5} \quad (9)$$

while the amplitude $S_{23}$ of the composite vector expressed by the equation (5) is transformed to:

$$S_{23} = \{a^2 + 2am \cos(-\omega t + \pi/2) + m^2\}^{0.5} \quad (10)$$

At $\omega t = 0$, the equations (9) and (10) are both expressed by:

$$S_{21}(0) = S_{23}(0) = \{a^2 + m^2\}^{0.5} \quad (11)$$

And, at $\omega t = \pi/2$:

$$S_{21}(\pi/2) = \{a^2 + 2am \cos(\pi) + m^2\}^{0.5} = a - m \quad (12)$$

$$S_{23}(\pi/2) = \{a^2 + 2am \cos(0) + m^2\}^{0.5} = a + m \quad (13)$$

Also, at $\omega t = 3\pi/2$:

$$S_{21}(3\pi/2) = a + m \quad (14)$$

$$S_{23}(3\pi/2) = a - m \quad (15)$$

Then, the amplitudes $S_{21}$ and $S_{23}$ at $\omega t = 3\pi/2$ are subtracted from those at $\omega t = \pi/2$:

$$S_{21}(\pi/2) - S_{21}(3\pi/2) = -2m \quad (16)$$

$$S_{23}(\pi/2) - S_{23}(3\pi/2) = 2m \quad (17)$$

It is understood from the equations (16) and (17) that the pickup 2 is shifted toward the track 1 if the difference presents a negative value, while the pickup 2 is shifted toward the track 3 if the difference presents a positive value, and that a value double a crosstalk amount m is outputted.

Further, even if determination is made at two points except $\omega t = \pi/2$ and $\omega t = 3\pi/2$, an output value corresponding to the determination times is derived and can be used as a feedback signal for tracking servo.

The present invention has been made based on the above described principle.

A first embodiment according to the present invention will be described with reference to FIG. 2.

In FIG. 2, an apparatus comprises an FM demodulator 1, an identification signal detecting circuit 2, a timing pulse generating circuit 3, a phase detecting means 4 and sampling circuit 5.

The FM demodulator 1 is for FM-demodulating a signal read from a central track. The output of the FM demodulator 1 is supplied to a signal output circuit, not shown, to reproduce a signal recorded on a medium.

The identification signal detecting circuit 2 is for detecting and outputting the starting point of an identification signal period shown in FIG. 1(A) from the output of the FM demodulator 1.

The timing pulse generating circuit 3 generates a pulse from the output from the identification signal detecting circuit 2 at a time the phase angle between a carrier of the central track and that of an adjacent track presents $\pi/2$.

The phase detecting means 4 is composed of a phase comparator (PHD) 41, a low pass filter (LPF) 42 and a voltage controlled oscillator (VCO) 44. The LPF 42 removes carrier components and lets phase components generated by crosstalk pass therethrough, while the LPF 43 removes these phase components, and direct current components for creating a reference carrier passes therethrough and is inputted to the VCO 44.

The sampling circuit 5 is also provided.

The PHD 41 is supplied with a signal from the pickup 2 and a carrier signal from the VCO 44 and outputs a signal corresponding to the phase difference. The LPF 42 outputs a signal expressed by the equation (4) or (6), which has no carrier components.

The timing pulse generator 3 generates a pulse at a time $\omega t = \pi/2$ and the pulse is supplied to the sampling circuit 5 as a sampling pulse. Thus, the sampling circuit 5 samples and outputs an output expressed by the equation (7) or (8).

Incidentally, although in the first embodiment, sampling is performed at a time $\omega t = \pi/2$, the output expressed by the equation (5) or (6) can be derived even when sampling is performed at any other predetermined time within the identification signal period, and this output may be used as a feedback signal for tracking servo.

Now, a second embodiment of the present invention will be described with reference to FIG. 3.

Figure 3:
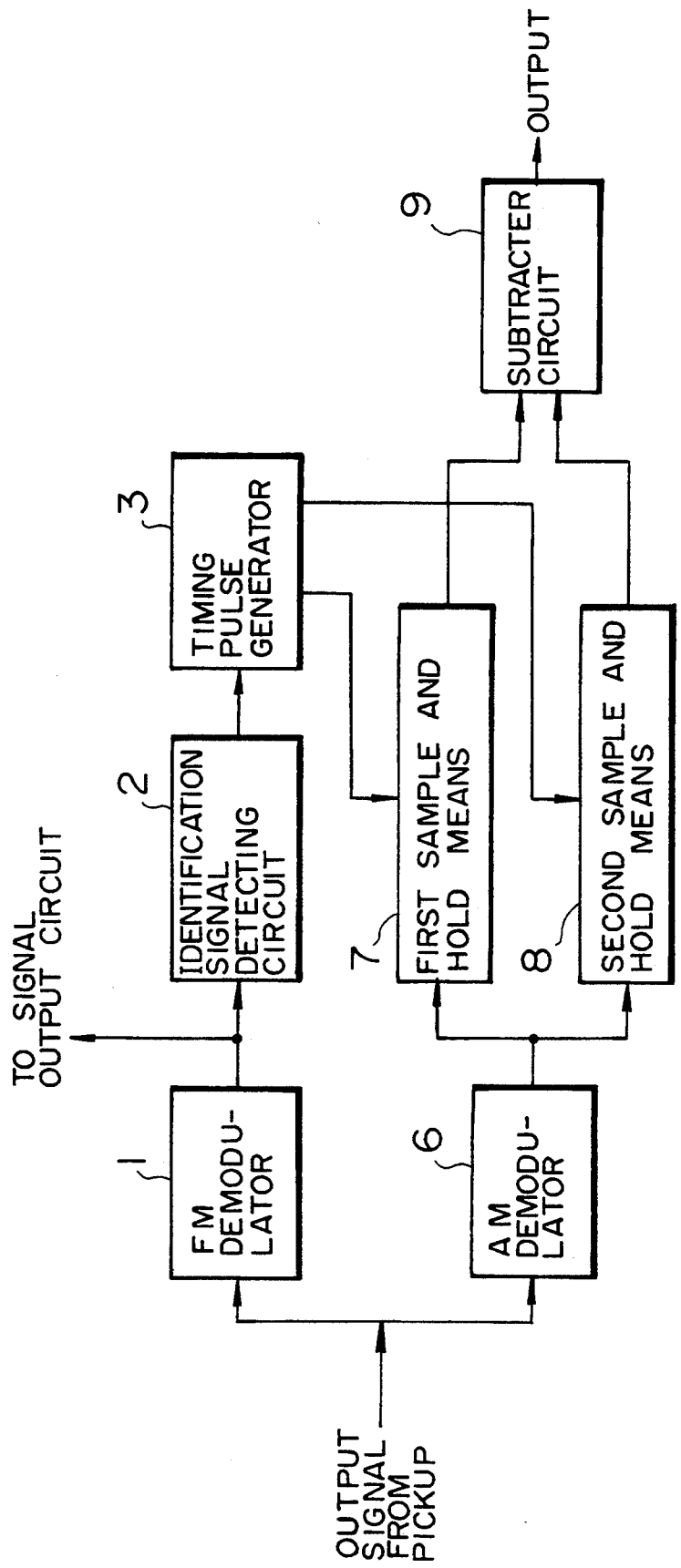
FIG. 3 is a block diagram illustrating the configuration of another embodiment of a crosstalk detecting apparatus according to the present invention.

In FIG. 3, an FM demodulator 1, an identification signal detecting circuit 2 and a timing pulse generator 3 are the same as respective ones of the first embodiment. However, in the second embodiment, a timing pulse from the timing pulse generator 3 is generated at two points of time when the phase angle between a carrier of a central track and that of an adjacent track presents $\pi/2$ and $3\pi/2$, respectively.

An AM demodulator 6 AM-demodulates a signal read from the central track. A first sample and hold means 7 samples and holds an output from the AM demodulator 6 at the time $\omega t = \pi/2$. A second sample and hold means 8 samples and holds the output from the AM demodulator 6 at the time $\omega t = 3\pi/2$.

A subtracter circuit 9 performs subtraction between the values held in the first and second sample and hold circuits 7 and 8 and outputs the difference therebetween.

The AM demodulator 6 outputs a signal expressed by the equation (9) or (10). The first sample and hold means 7 holds a value expressed by the equation (12) or (13). The second sample and hold means 8 holds a value expressed by the equation (14) or (15). The subtracter circuit 9, therefore, outputs a value double a crosstalk amount expressed by the equation (16) or (17).

Incidentally, in the second embodiment, in case that the timing pulse generator 3 generates sampling pulses at two points of time $\omega t = 0$ and $\omega t = \pi/2$, the first and second sample and hold means 7 and 8 hold a value expressed by the equation (11) at $\omega t = 0$ and a value expressed by the equation (12) or (13) at $\omega t = \pi/2$, respectively.

Therefore, the subtractor circuit 9 outputs a crosstalk value expressed by:

$$E_{21} = (a^2 + m^2)^{0.5} - (a - m) \quad (18)$$

$$E_{23} = (a^2 + m^2)^{0.5} - (a + m) \quad (19)$$

When m is sufficiently small as compared with a, $(a^2+m^2)^{0.5}$ can be expressed by $a+m^2/2a$. Therefore, the equations (18) and (19) in this condition are expressed by:

$$E_{21}=(m^2+2am)/2a \quad (20)$$

$$E_{23}=(m^2-2am)/2a \quad (21)$$

A positive value of E represents an amount of crosstalk occurring when the pickup 2 is shifted toward the track 1, while a negative value of E represents an amount of crosstalk occurring when the pickup 2 is shifted toward the track 3.

It will be appreciated also in the second embodiment that sampling may be performed at other two points of time within an identification signal period, and the difference may be used as a feedback signal for tracking servo.

As described above, the present invention has advantage as followings:

(1) Since FM waves are recorded on a medium such that initial phases thereof on a central track and adjacent tracks are all made equal, and a phase difference in the case when signals read from the central track does not include any crosstalk is detected and outputted as a crosstalk amount, the apparatus can be made simple in construction.

(2) FM waves are recorded on a central track and both adjacent tracks on a medium such that initial phases of both the adjacent tracks are respectively made different by $\pi/2$ with respect to the central track, a signal read from the central track is AM-modulated, and the difference in AM-modulated output values between two points of time within an identification signal period is outputted as a crosstalk amount, so that the apparatus can be made simple in construction.

While embodiments of the present invention have hereinbefore been described, the present invention is not limited to those embodiments and a variety of modifications can also be made in accordance with the gist of the present invention.

What is claimed is:

1. A crosstalk detecting apparatus for detecting an amount of crosstalk which occurs when an image signal and identification signals are read from a medium on which said image signal and said identification signals are FM-modulated and sequentially recorded on three tracks adjacent to one another, wherein said FM-modulated identification signals are of respective different frequencies and are recorded on respective ones of said three tracks such that initial phases thereof on said three tracks are all made equal, said apparatus comprising:

timing pulse generating means for generating a timing pulse at a predetermined time after start of reading said FM-modulated identification signal from the central track and within a time period during which said identification signals are being read;

phase detecting means for detecting a phase difference between said FM-modulated identification signal read from the central track and said FM-modulated identification signal read from said central track with any crosstalk from adjacent ones of said three tracks removed therefrom; and sampling means for sampling an output from said phase detecting means with said timing pulse produced by said timing pulse generating means to thereby produce a signal indicative of an amount of crosstalk contained in signals read from said central track.

2. A crosstalk detecting apparatus for detecting an amount of crosstalk which occurs when an image signal and identification signals are read from a medium on which said image signal and said identification signals are FM-modulated and sequentially recorded on three tracks adjacent to one another, wherein said FM-modulated identification signal are of respective different frequencies and are recorded on respective ones of said three tracks such that initial phases thereof differ by $\pi/2$ between the central track and each of the tracks adjacent to the central track, said crosstalk detecting apparatus comprising:

timing pulse generating means for generating first and second pulse signals at respective different first and second points of time during a time period in which said identification signals are being read;

AM demodulating means for AM-demodulating a signal read from the central track;

first sample and hold means for sampling an output of said AM demodulating means with said first pulse signal;

second sample and hold means for sampling the output of said AM demodulating means with said second pulse signal; and subtracting means for subtracting a sampled value held by one of said first and second sample and hold means from a sampled value held by the other sample and hold means to thereby produce a signal indicative of an amount of crosstalk contained in signals read from said central track.

* * * * *